(No Model.) 2 Sheets—Sheet 1.

P. CRAMER.
HANGER FOR SHAFTING.

No. 281,343. Patented July 17, 1883.

Witnesses: Victor Vallières
Edouard Vallières

Inventor:
Philip Cramer (No Model.) 2 Sheets—Sheet 2.

P. CRAMER.
HANGER FOR SHAFTING.

No. 281,343. Patented July 17, 1883.

Witnesses.

Inventor.

Philip Cramer

UNITED STATES PATENT OFFICE.

PHILIP CRAMER, OF MONTREAL, QUEBEC, CANADA.

HANGER FOR SHAFTING.

SPECIFICATION forming part of Letters Patent No. 281,343, dated July 17, 1883.

Application filed September 28, 1882. (No model.) Patented in Canada December 4, 1881, No. 13,794.

*To all whom it may concern:*

Be it known that I, PHILIP CRAMER, a citizen of the United States, residing at Montreal, in the Province of Quebec, in the Dominion of Canada, have invented a new and useful Hanger for Shafting, (for which I have obtained a patent in the Dominion of Canada, No. 13,794, bearing date December 4, 1881,) of which the following is a specification.

My invention relates to the combination of a hanger-frame and box on the one part and a short rocking shaft on the other part, which shaft is placed in the frame underneath the box in a direction transversal to the line of shafting, and which has the double purpose of keeping the box in the frame and of permitting universal motion to the box.

My invention also relates to a box which is extended beyond its proper bearing-surface for the shaft, in order to inclose disks or rings, which are fastened upon the shaft and revolve with the shaft. The object of these disks or rings upon the shaft revolving within the extended cavity of the box is to prevent the oil from spreading along upon the shaft beyond the box and be thrown by the shaft—a defect which makes many hangers unfit for the important use in cotton-mills, silk-factories, &c.

Figure 2:
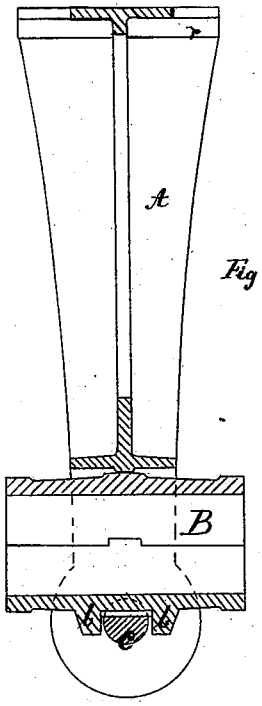
Figure 1:
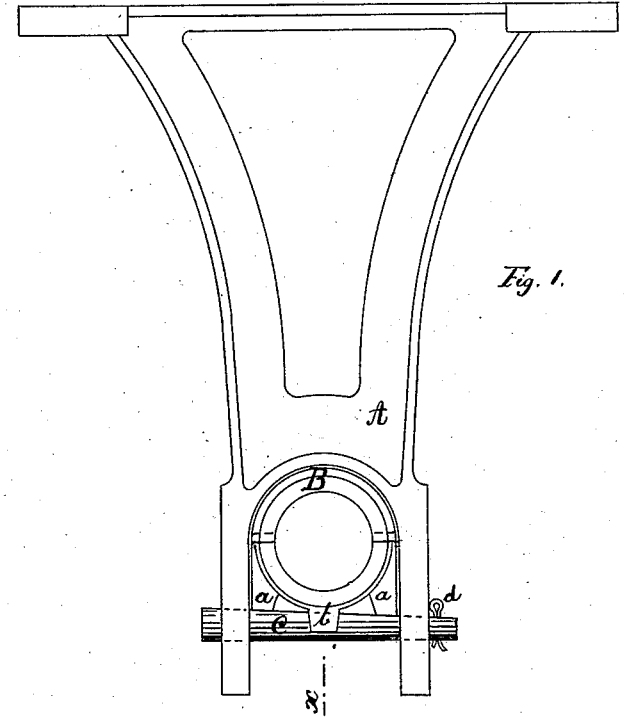
Figure 4:
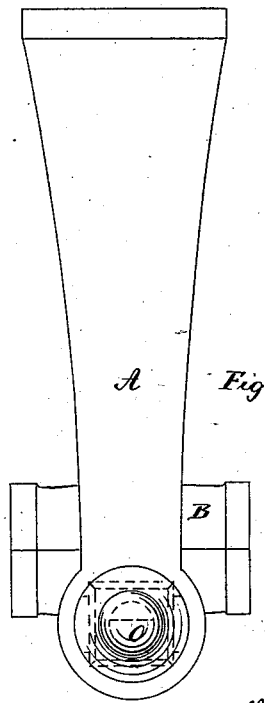
Figure 3:
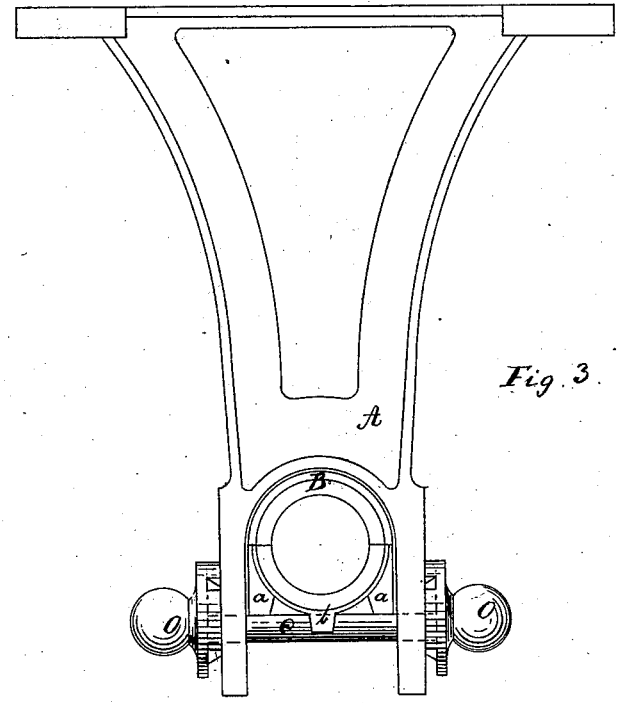
Figure 5:
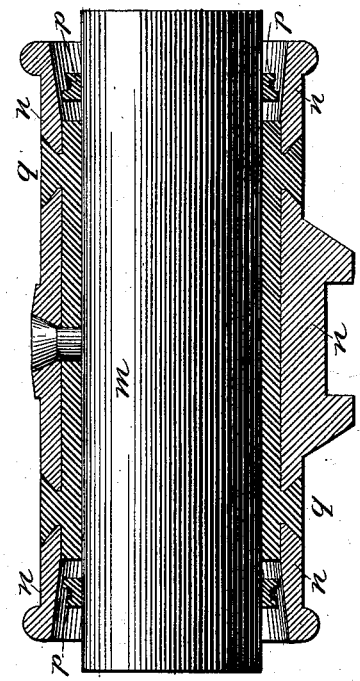
Figure 6:
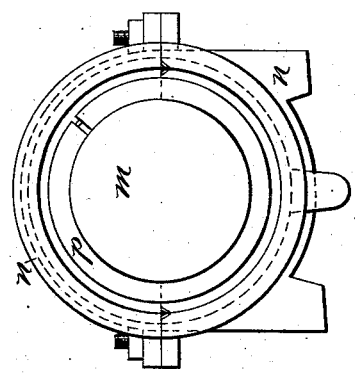

In the drawings, Figure 1 represents an elevation of the hanger, taken in a direction of the line of shafting. Fig. 2 shows a sectional view of the hanger, taken through line $x\, y$. Figs. 3 and 4 show two views of a simple device for holding the rocking shaft in position. Figs. 5 and 6 show section and end view of the box on the one part and the rings upon the shaft on the other part.

Similar letters refer to similar parts throughout the several views.

A represents the hanger-frame; B, the box, which, if made in halves, the latter must be checked or bolted together in such a manner as to cause the two halves to act like one solid box. C is the rocking shaft. The upper part of the box is provided with a rounded surface, which is rounded from the center of the rocking shaft in order to allow of movement for the box in the frame when rocking upon the shaft, and the sides of the box are provided with surfaces rounded from the center of the box in order to allow of movement for the box when sliding upon the rocking shaft. The box rests upon the rocking shaft with parts $a$, and it overlaps the rocking shaft with parts $b$, by means of which it is prevented from working itself out of the frame in the direction of the line of shafting. The rocking shaft is tapered on the side wherewith it bears against the box, and is kept from working out of the frame by pins $d$.

In Figs. 3 and 4 two views are shown of a device for the purpose of keeping a parallel rocking shaft in the frame. Ornamental pieces O are of a shape suited to dovetail-shaped lugs upon the frame in a manner that they may be placed upon the frame in a position in which they will cover the holes in which the working-shaft rests. This design is calculated to reduce the labor of fitting the hanger to merely the planing of a round piece of iron down to the fit.

Figs. 5 and 6 show section and end view of the box on the one part and the rings upon the shaft on the other part, Fig. 5 being a section of the box and rings, leaving the shaft uncut; and Fig. 6 is the end view. $m$ represents the shaft; $n$, the shell of the box extended beyond Babbitt bearing $q$. $p\, p$ are the rings upon the shaft. The oil from the bearing, if spreading upon the shaft, will be thrown by the rings, which are to run so close to the box as to let go of the oil gently against the sides of the extended box, where the oil will collect, and, having lost all velocity, will run smoothly out of the box into a reservoir.

My system for hangers, compared with other systems, has an advantage in cheapness, because it allows of smallest weight by equal strength and convenience, and it requires less fitting.

What I claim, and desire to secure by Letters Patent of the United States, is—

1. The combination of a hanger-frame with box and rocking shaft, substantially as and for the purpose herein set forth.

2. The combination of an extended box with rings secured upon the shaft, substantially as described, and for the purpose herein set forth.

PHILIP CRAMER.

Witnesses:
EDWARD VALLIÈRES,
VICTOR VALLIÈRES.